UNITED STATES PATENT OFFICE.

GEORGE H. GRAY, OF DENVER, COLORADO.

PROCESS OF MAKING SODA WITH STRONTIUM SALTS.

SPECIFICATION forming part of Letters Patent No. 459,688, dated September 15, 1891.

Application filed May 12, 1891. Serial No. 392,487. (No specimens.)

*To all whom it may concern:*

Be it known that I, GEORGE H. GRAY, of Denver, in the county of Arapahoe and State of Colorado, have invented a new and Improved Process for Converting Strontium Sulphate into Strontium Carbonate and Applying the Same to the Manufacture of Caustic Alkalies, of which the following is a full, clear, and exact description.

My invention consists in producing strontium carbonate from strontium sulphate by treating it with magnesium carbonate in the presence of water or water holding in solution carbon dioxide or an alkaline salt.

The operation is so conducted that a continual regeneration of the reagents is effected.

The advantages of the process are obvious. The continual regeneration and utilization of reagents avoids the introduction of extraneous impurities and obviates excessive waste.

To a solution of sodium chloride about half-saturated with that salt, I add enough of magnesium carbonate and strontium sulphate, so that as near as practicable the number of atoms of the dyad magnesium and strontium will each equal one-half the number of atoms of the monad sodium. Preferably there should be an excess of carbon dioxide present to make the magnesium carbonate more soluble. Strontium sulphate is much more soluble in a solution of sodium chloride or of magnesium chloride than in pure water. The stirring or agitation of the liquid and salts accelerates the reaction. Magnesium sulphate and strontium carbonate are formed by double decomposition. The strontium carbonate is precipitated and the sodium and magnesium salts remain in solution and may be separated from the precipitated strontium carbonate by siphoning, decanting, or filtering, and by careful washing all or nearly all of the sodium and magnesium salts may be removed. Then I bring the solution which contains the magnesium and sodium salts to saturation by evaporation. The next step in the process is to precipitate the sodium as sulphate and hold the magnesium in solution as chloride. This may be either done by the cold or humid method. I prefer to do it by cold. The degree at which the sodium sulphate is precipitated is given at about 24° Fahrenheit. When the precipitation is effected, the solution which contains the magnesium chloride is separated by siphoning, decanting, or filtering. The last portions of magnesium chloride I prefer to remove by washing the precipitated sodium sulphate with a saturated solution of sodium sulphate. The strontium carbonate precipitated as aforesaid I prefer to convert into caustic strontium or strontium hydrate by heating in an atmosphere of steam, which is a well-known method.

I produce caustic soda by the well-known method of treating sodium sulphate with strontium hydrate in the presence of a small amount of water. I use for this part of the process the sodium sulphate precipitated as aforesaid and the strontium hydrate made as above stated. In this reaction strontium sulphate is formed, and caustic soda is left in solution and is removed by siphoning, decanting, or filtering and the last portions removed by washing the precipitate. The precipitated strontium sulphate is then ready to be again converted into carbonate and then into hydrate, as hereinbefore shown. The caustic soda can be converted into a solid state by evaporation by heat. The magnesium can be recovered from the chloride by evaporating to dryness and heating in the presence of steam or can be precipitated with quicklime, such reaction being well known.

The magnesium oxide or hydrate is converted into carbonate by steam and carbonic-acid gas or by carbonic-acid gas alone, according to the usual methods. I prefer the carbonating to be done in the presence of moisture and at ordinary temperature, at least at the end of the reaction, so that some acid magnesium carbonate will be formed, for the reason hereinbefore stated. Caustic potassa may be made in a similar manner.

It is obvious that the strontium hydrate may be used in the manufacture of other alkaline hydrates, such as potassium hydrate. Where applied to potassium hydrate the precipitation of the potassium sulphate is best effected by heating under pressure produced by steam, a well-known reaction. The magnesium carbonate alone in the presence of water, if there is some acid magnesium carbonate present, will convert strontium sulphate into strontium carbonate by double decomposition, though I prefer to use the above method in the manufacture of soda, as anhydrous chloride of sodium is much more expensive than the solution, as that may be often taken directly from saline wells. I prefer to utilize the tendency of magnesium salts to form double salts with the salts of the alkalies, which tendency makes magnesium a much more active reagent in the presence of a soluble alkaline salt, which, together with the fact that the magnesium salt going into the solution would help to bring the solution from which the soda has to be precipitated as sulphate to saturation without adding anhydrous sodium chloride, is sufficient to give it the preference.

Having thus fully described my invention, I claim as new and desire to secure by Letters Patent—

1. The process of producing sodium or potassium hydrate by reacting on sodium or potassium sulphate with strontium hydrate, recovering the strontium by treatment with magnesium carbonate, followed by heating the strontium thus produced in an atmosphere of steam, substantially as described.

2. The process of producing sodium or potassium hydrate by treatment of sodium sulphate with strontium hydrate, followed by treatment of the strontium sulphate thus produced with magnesium carbonate and sodium or potassium salts, thus producing strontium carbonate, to be afterward converted into strontium hydrate, substantially as described.

3. The process of producing strontium carbonate by treating strontium sulphate with magnesium carbonate, substantially as described.

GEORGE H. GRAY.

Witnesses:
E. M. CLARK,
ALFRED LURCOTT.